United States Patent
Verhaeghe et al.

(10) Patent No.: US 10,568,269 B2
(45) Date of Patent: Feb. 25, 2020

(54) AGRICULTURAL BALER WITH IMPROVED FRICTION OR MOISTURE SENSOR POSITIONING

(71) Applicant: CNH Industrial America LLC, New Holland, PA (US)

(72) Inventors: Didier O. M. Verhaeghe, Ypres (BE); Stefan De Rycke, Olsene-Zulte (BE); Johan A. E. Vande Ryse, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 156 days.

(21) Appl. No.: 14/410,546

(22) PCT Filed: Jun. 18, 2013

(86) PCT No.: PCT/EP2013/062562
§ 371 (c)(1),
(2) Date: Dec. 22, 2014

(87) PCT Pub. No.: WO2013/189903
PCT Pub. Date: Dec. 27, 2013

(65) Prior Publication Data
US 2015/0334923 A1 Nov. 26, 2015

(30) Foreign Application Priority Data

Jun. 22, 2012 (BE) .................. 2012/0427

(51) Int. Cl.
*A01F 15/04* (2006.01)
*A01F 15/08* (2006.01)
*A01F 15/10* (2006.01)

(52) U.S. Cl.
CPC .......... *A01F 15/046* (2013.01); *A01F 15/042* (2013.01); *A01F 15/0825* (2013.01); *A01F 15/0841* (2013.01); *A01F 15/101* (2013.01)

(58) Field of Classification Search
CPC .... A01F 15/046; A01F 15/042; A01F 15/101; A01F 15/0841; A01F 15/0825; A01F 15/0875; B30B 9/3007
(Continued)

(56) References Cited

U.S. PATENT DOCUMENTS 4,148,254 A * 4/1979 Graber .................. B30B 9/3025
100/179
4,750,418 A 6/1988 Naaktgeboren
(Continued)

FOREIGN PATENT DOCUMENTS

| DE | 2734766 A1 | 2/1978 |
|----|----|----|
| DE | 102004941 A1 | 8/2003 |
| DE | 102004027612 A1 | 1/2006 |

*Primary Examiner* — Jimmy T Nguyen
(74) *Attorney, Agent, or Firm* — Patrick M. Sheldrake; Peter K. Zacharias

(57) ABSTRACT

An agricultural baler for producing rectangular bales, having a reciprocating plunger moving back and forth in the enclosure formed by walls, thereby compressing crop material and forming rectangular bales, and further including at least one actuator for adapting the cross-section of the enclosure depending on the required pressure that needs to be exerted on the advancing bale. Actuators can apply their force on the sidewalls along transversal support beams or brackets forming the 'density belt'. The baling chamber is provided with one or more friction or moisture sensors which are placed at the location or in the immediate vicinity of one or more side wall reinforcements.

2 Claims, 3 Drawing Sheets

(58) Field of Classification Search
USPC ....... 100/43, 45, 178, 179, 188 R, 189, 191, 100/192
See application file for complete search history.

(56) References Cited

U.S. PATENT DOCUMENTS

| | | | |
|---|---|---|---|
| 4,791,865 A * | 12/1988 | Naaktgeboren | A01F 15/0875 100/188 R |
| 4,815,373 A * | 3/1989 | Sudbrack | A01F 15/0825 100/191 |
| 4,916,888 A | 4/1990 | Sheehan et al. | |
| 4,918,910 A * | 4/1990 | Sheehan | A01F 15/0816 100/45 |
| 6,101,932 A | 8/2000 | Wilkens | |
| 6,526,731 B1 * | 3/2003 | Hunter | A01F 15/005 100/17 |
| 7,231,814 B2 | 6/2007 | Platon et al. | |
| 7,340,996 B1 | 3/2008 | Viaud | |
| 2012/0186466 A1 | 7/2012 | Vande Ryse | |
| 2014/0090568 A1 * | 4/2014 | Missotten | A01F 15/08 100/346 |

\* cited by examiner

PRIOR ART

Figure 1A:
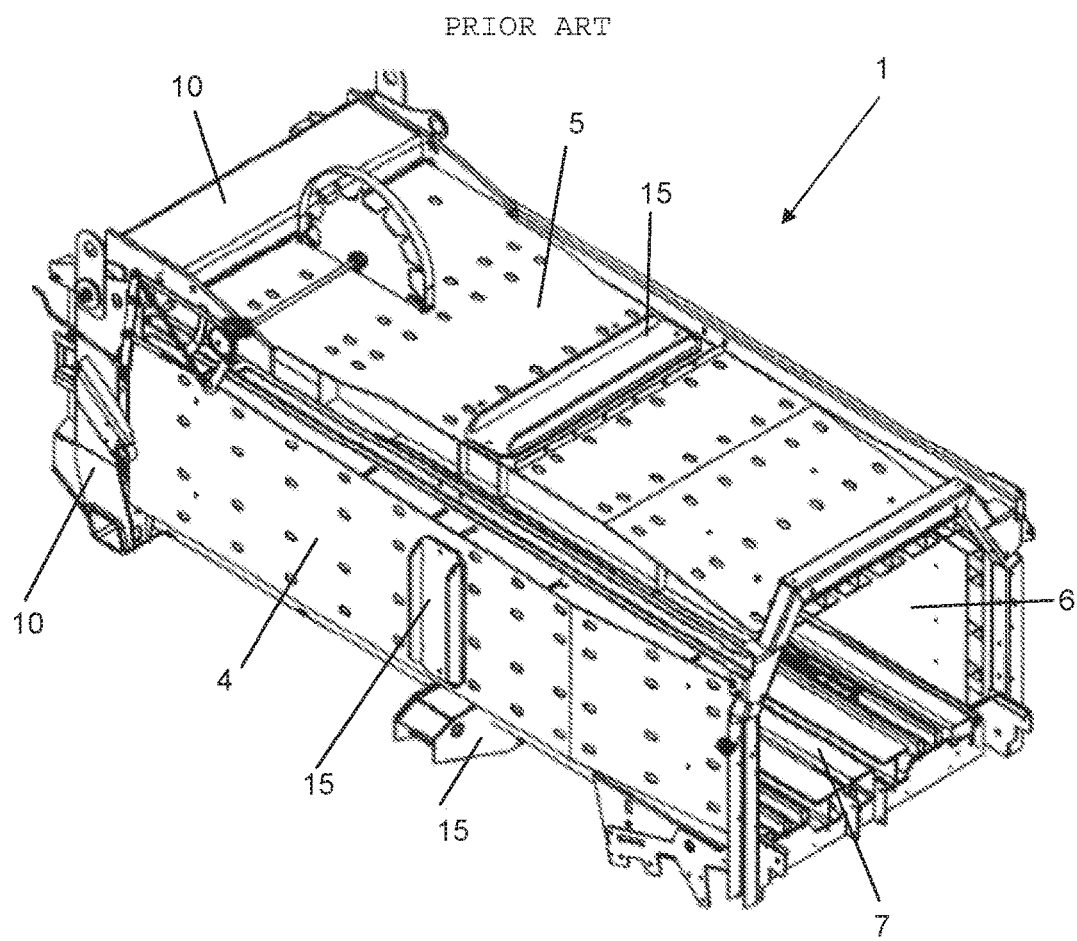
Figure 1B:
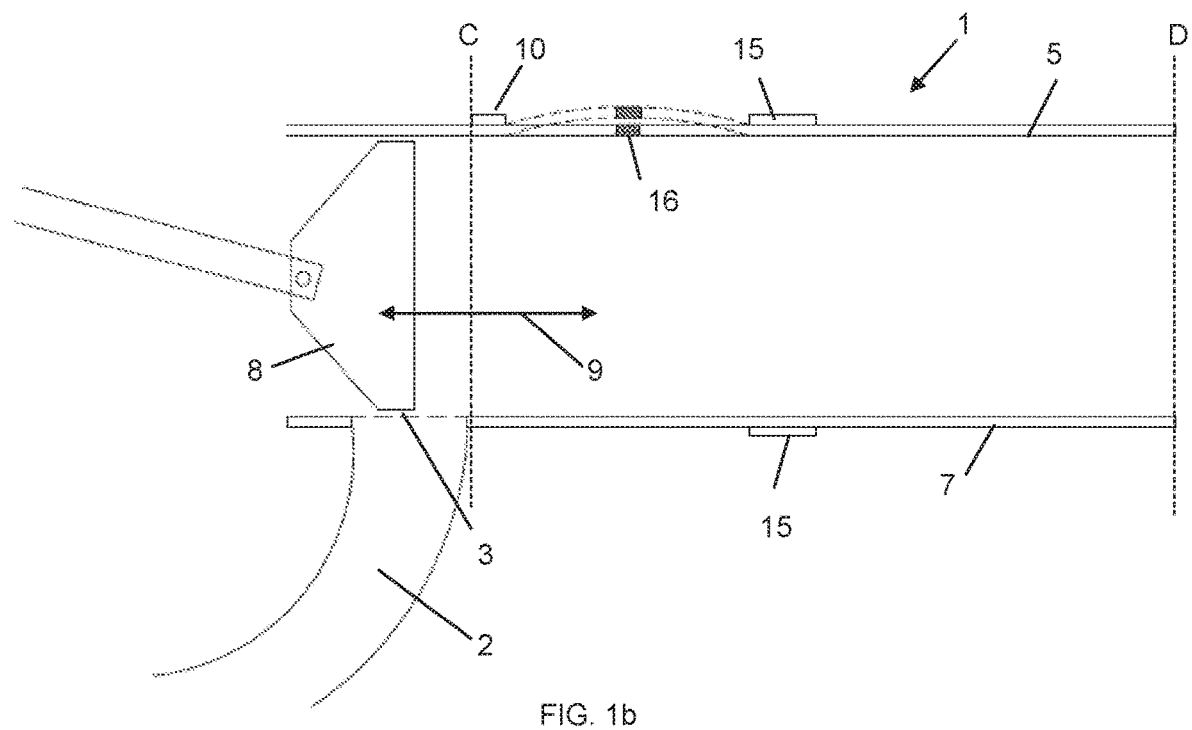

AGRICULTURAL BALER WITH IMPROVED FRICTION OR MOISTURE SENSOR POSITIONING

This application is the US National Stage filing of International Application Serial No. PCT/EP2013/062562 filed on Jun. 18, 2013 which claims priority to Belgian Application BE2012/0427 filed Jun. 22, 2012, each of which is incorporated herein by reference in its entirety.

FIELD OF THE INVENTION

The present invention is related to agricultural balers, used for picking up crop material such as hay or straw from the field or receiving crop material from a harvester, and forming it into rectangular bales.

STATE OF THE ART

Agricultural square or rectangular balers gather crop material into a baling chamber where the material is compressed by a reciprocating plunger to form rectangular bales. The movement of the crops inside the baling chamber is influenced by the moisture level of the crops. The higher the moisture level, the higher the friction force between the baling chamber's side walls and the crops as they are compressed by the plunger. For this reason, one or more moisture and/or friction sensors are commonly incorporated in the chamber. These sensors are configured to interact with one or more actuators arranged to apply an exterior force on the sidewalls, thereby adapting the chamber's cross sectional area, in order to increase or relieve the pressure exerted by these side walls on the bale. Friction or moisture sensors are commonly mounted on one or more sidewalls, in between the inlet of the chamber and the actuators. Due to deformation of the sidewalls caused by the high pressure exerted on the bale, the moisture/friction measurement may become inaccurate.

SUMMARY OF THE INVENTION

The present invention is related to an agricultural baler for producing rectangular bales, provided with a baling chamber formed by four side walls, as disclosed in the appended claims. A reciprocating plunger is moving back and forth in the enclosure formed by said walls, thereby compressing crop material and forming rectangular bales. Actuators are provided for adapting the cross-section of the enclosure depending on the required pressure that needs to be exerted on the advancing bale. The actuators apply their force on the sidewalls along transversal support beams or brackets forming the 'density belt'. The baling chamber is provided with one or more friction or moisture sensors. According to the invention these sensors are placed at the location or in the immediate vicinity of one or more reinforcement means arranged in connection with at least one of said sidewalls, said reinforcement means forming an obstruction that locally neutralizes or limits deformation of said sidewalls, said deformation taking place by bulging outwards with respect to the interior of the baling chamber, said deformation being a consequence of the bale forming process. According to a first embodiment of the invention, said sensors are located in the immediate vicinity of the 'density belt'. According to a second embodiment, at least one side wall is provided with a transversal ridge pointing towards the interior of the chamber, and at least one friction or moisture sensor is located in the immediate vicinity of said ridge. According to a third embodiment, at least one sensor is located in the immediate vicinity of a longitudinal reinforcement beam. When it is stated that the sensor is 'at the location of a reinforcement means', this is to be understood as: the sensor is located on a portion of a sidewall of the baling chamber where said reinforcement means (e.g. beam or ridge) is attached to or located on the sidewall.

BRIEF DESCRIPTION OF THE FIGURES

FIG. 1*a* is a 3D-view of a baling chamber for forming rectangular bales, as generally known in the art. FIG. 1*b* is a schematic side view cross section of such a known baling chamber.

FIG. 2 is a schematic side-view of a baling chamber in a baler according to a first embodiment of the invention.

FIG. 3 shows a baling chamber in a baler according to another embodiment of the invention.

FIG. 4 shows a baling chamber according to another embodiment, wherein the upper wall is provided with longitudinal reinforcement beams.

DETAILED DESCRIPTION OF PREFERRED EMBODIMENTS OF THE INVENTION

The problems highlighted above in relation to known rectangular balers, as well as preferred embodiments of the invention which solve said problems will now be described with reference to the drawings. The detailed description is not limiting the scope of the invention, which is defined only by the appended claims.

FIG. 1*a* shows a typical baling chamber 1 of a rectangular agricultural baler known in the art. FIG. 1*b* shows a cross section of the baling chamber in a simplified schematic drawing. Crop material is fed from a pre-compression chamber 2 that itself receives crops that are harvested from the ground through a suitable supply means (not shown). The material is fed into the baling chamber through an inlet section 3. The chamber is defined by its four sidewalls 4 to 7 arranged between a first section C at the baling chamber's inlet side and a second section D at the chamber's outlet side. Inside the chamber, a plunger 8 is arranged to move reciprocally in the longitudinal direction 9 of the chamber. The movement of the plunger from left to right is coordinated with the feeding of pre-compressed material into the chamber through inlet section 3, so that each volume of pre-compressed material is pushed into the chamber and added to a bale that is being formed inside the chamber.

Transversally with respect to the longitudinal direction 9, support beams 10 are mounted on the vertical side walls 4 and 6 and on the top wall 5 at the inlet side of the baling chamber. These support beams or equivalent means are the 'fixed points' of the side walls 4 to 6. The sidewalls 4 to 6 are arranged to be pivotable with respect to these fixed points, so that the cross-section of the baling chamber can be adapted according to the need for a higher or lower pressure on the advancing bales. In order to do this, suitable actuators (not shown) are configured to apply pressure on the sidewalls 4 to 6, this pressure being applied on the beams 15 arranged transversally on those side walls. The beams 15 may be referred to as the 'density belt' of the baling chamber. The actuators can be a number of hydraulic pistons arranged around the chamber.

A sensor 16 is shown, mounted on the top wall 5, in between the support beams 10 and the density belt 15, and arranged to be in contact with the crop material in the baling chamber. In the context of the present description, this sensor will be referred to as a 'friction or moisture sensor' or 'friction/moisture sensor'. It may be any known type of sensor that either measures directly the friction forces between crops moving forward in the baling chamber and the sensor, or that measures the moisture content of the advancing crops, in order to derive from that measurement the actual friction or moisture content. The location indicated in FIG. 1b is a typical location for such a friction/moisture sensor in a baling chamber as known in the art. The inventors of the present invention have found that this location is a source of errors in the obtained friction or moisture measurements, as a consequence of deformations of the chamber's side walls during and as a consequence of the bale forming process.

As the bale is being formed in the chamber, pressure builds up inside said chamber. FIG. 1b illustrates the deformation that was found to take place as a consequence of this internal pressure build-up: the sidewalls tend to bulge outwards with respect to the interior of the baling chamber. This deformation causes a decrease of the pressure exerted by the crop on the sensor, and thereby deteriorates the quality of the measurement.

Figure 2:
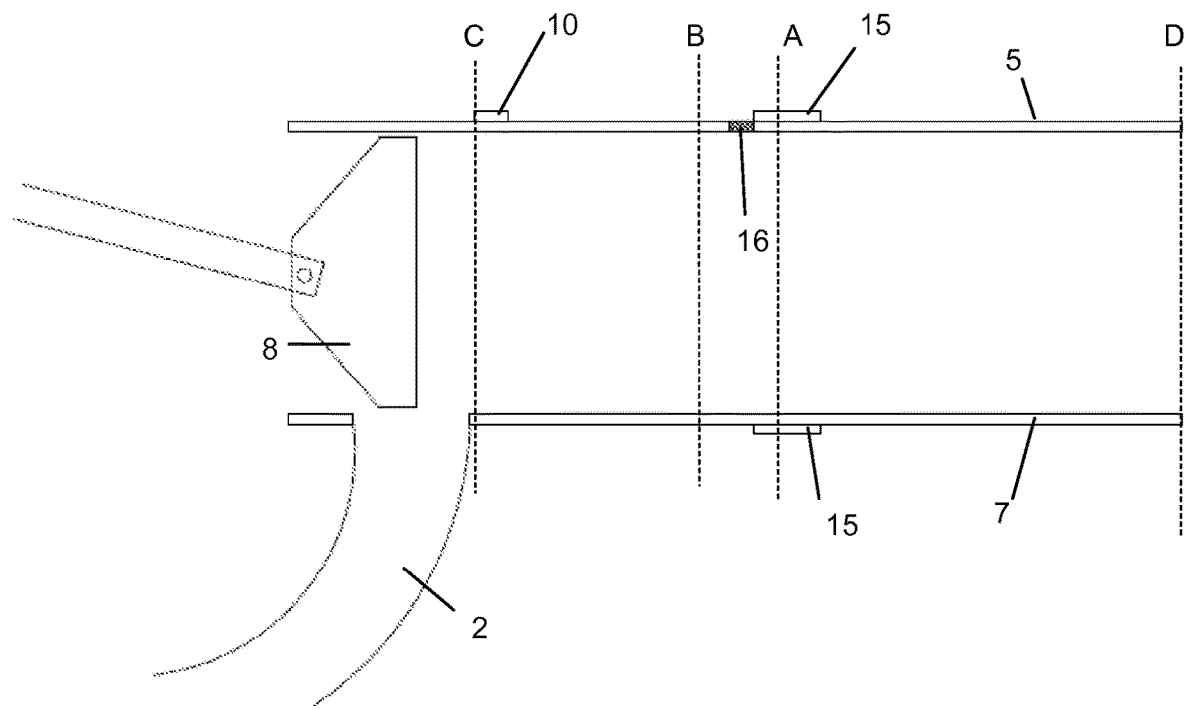

FIG. 2 shows a baling chamber in a baler according to a first embodiment of the invention. The friction/moisture sensor 16 is placed immediately before the beams 15 forming the density belt. These beams reinforce the baling chamber's sidewalls: they form an obstruction that neutralizes or limits the above-described outward bulging deformation. Therefore, at the location of the sensor 16, the walls are not or not substantially deformed during the internal pressure build-up, hence the friction/moisture measurement remains reliable at all times. The location shown is not limiting the scope of the invention. According to a preferred embodiment, the sensor 16 is placed at a distance from the density belt 15 that is maximum one fourth of the distance between said density belt and the first section C or second section D of the baling chamber, depending on whether the sensor is placed to the left of the density belt 15 or to the right as seen in the enclosed drawings. For example, according to this embodiment, the sensor is placed between sections A and B shown in FIG. 2, section A corresponding to the position of the density belt 15, the distance between sections A and B being one fourth of the distance between section A and the first section C of the baling chamber. Likewise, the sensor could be placed to the right of the density belt, at maximum one fourth of the distance between section A and the second section D.

The sensor may be placed on any of the side walls. Several sensors may be used instead of a single sensor. Instead of being placed to the left (as seen in the drawings) of a beam 15 of the density belt, the sensor may be placed also immediately underneath one of the beams 15 or to the right of said beam. It is preferred to have an overlap between the beam 15 and the sensor 16.

Figure 3:
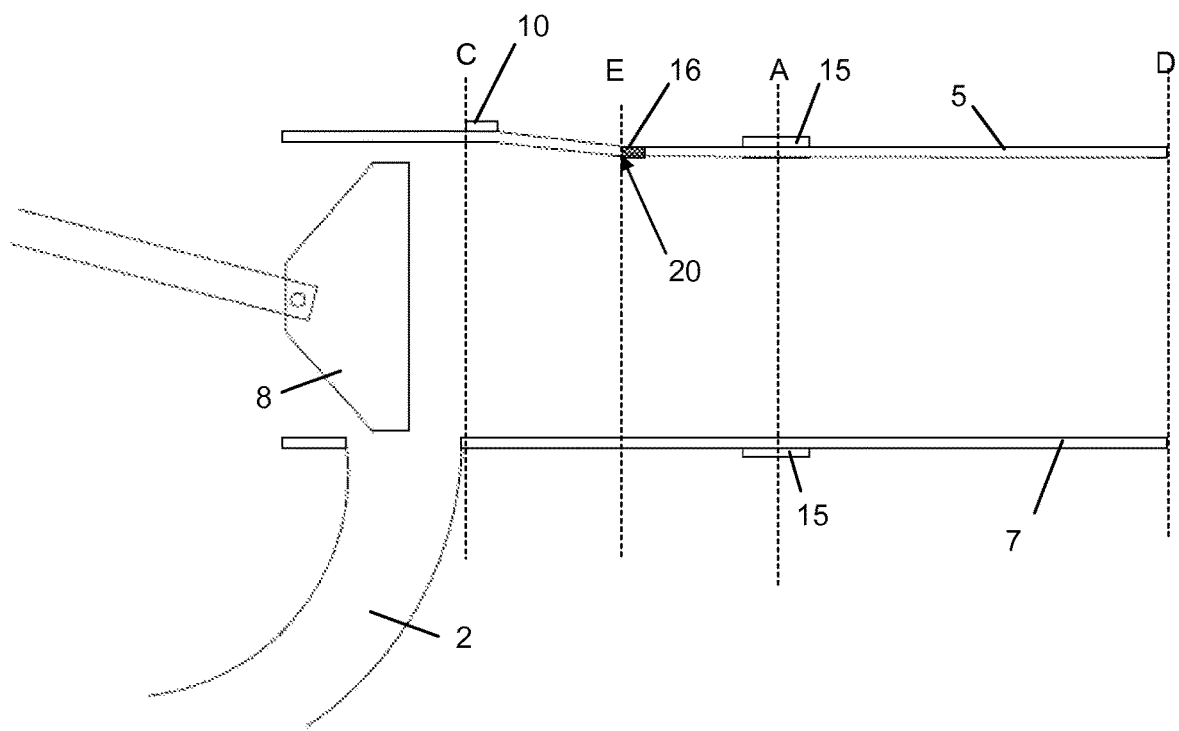

FIG. 3 shows another embodiment, wherein the baling chamber's side walls, or at least the top wall 5 is provided with a transversal ridge 20, situated between the beam 10 at the inlet and the beam 15 of the density belt. At the location of the ridge 20, the orientation of the side wall changes, in such a way that the angle formed by the parts of the side wall on either side of the ridge 20 is pointing towards the interior of the chamber (in other words, the ridge is seen as a dented portion in the exterior surface of the chamber, not as a bulging portion). This ridge 20 as such is a common feature of baling chambers known in the art, and aimed at increasing the density of the bale, as it advances in the baling chamber. According to the embodiment of FIG. 3, the friction/moisture sensor 16 is placed in the immediate vicinity of, preferably immediately downstream of the ridge (to the right of the ridge in the drawing of FIG. 3). As the ridge 20 forms an area that is more resistant to the deformation illustrated in FIG. 1b (i.e. the ridge forms an obstruction that neutralizes or limits that deformation), this location is beneficial for the operation of the sensor 16, for the same reasons as set out in relation to the embodiment of FIG. 2. According to a preferred embodiment, the sensor 16 is placed at a distance from the ridge 20 (section E) that is maximum one fourth of the distance between said ridge 20 and the first section C or the density belt (section A) of the baling chamber.

The invention is equally related to an embodiment wherein a friction/moisture sensor is present both at the location of or in the immediate vicinity of the density belt 15 and at the location of or in the immediate vicinity of a ridge 20 in one of the side walls.

Figure 4:
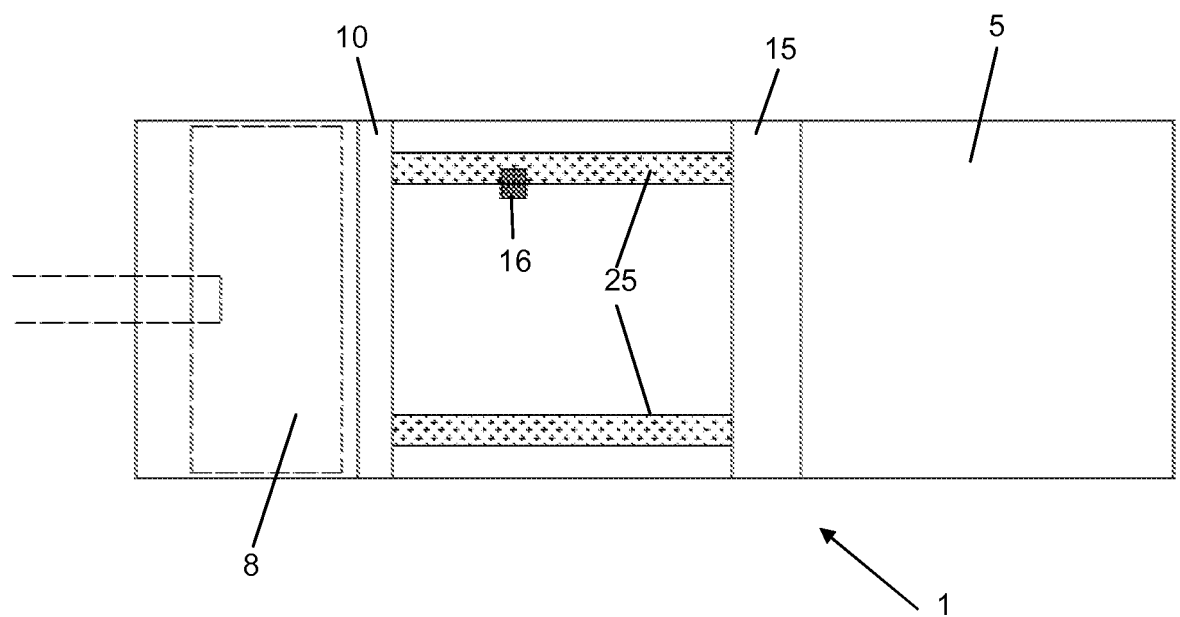

FIG. 4 represents another embodiment. A top view of the baling chamber is shown. Between the support beams 10 and the density belt 15, longitudinal reinforcement beams 25 are mounted on the upper side wall. Like the density belt and the ridge described in the previous embodiments, the reinforcement beams 25 form an obstruction that locally neutralizes or limits the outward bulging deformation of the baling chamber's sidewall. The moisture/friction sensor 16 is mounted halfway between the support beams 10 and the density belt 15, but in the immediate vicinity of one of the longitudinal reinforcement beams 25. In the example of FIG. 4, the sensor is mounted so as to overlap with said beam 25. The longitudinal beams 25 may extend over a longer distance than the distance between the support beams 10 and the density belt 15.

The invention is equally related to an embodiment wherein a friction/moisture sensor 16 is present at the location of or in the immediate vicinity of the density belt 15, at the location of or in the immediate vicinity of a ridge 20 in one of the side walls and at the location of or in the immediate vicinity of a longitudinal reinforcement beam 25.

All of the embodiments described above are thus representations of the invention, according to which the moisture/friction sensor is located at or in the immediate vicinity of a reinforcement means configured to obstruct the outward bulging deformation of the baling chamber's wall. According to an embodiment, 'in the immediate vicinity' means at a maximum distance of 25 cm from said reinforcement means. According to a specific embodiment, said distance between the sensor position and the reinforcement means is between 5 cm and 10 cm. In the above, the distance between the sensor and a reinforcement means (such as a beam or a ridge) is the shortest distance between the sensor position and said reinforcement means.

The invention claimed is:

1. An agricultural baler for producing rectangular bales comprising:
   a pre-compression chamber,
   a crop material supply that supplies harvested crop material to said pre-compression chamber,
   a baling chamber that receives pre-compressed material from the pre-compression chamber, the baling chamber comprising:
      four sidewalls defining a rectangular enclosure extending in a longitudinal direction between a first section at an inlet side of the baling chamber and a second section at an outlet side of said chamber, at least one of said sidewalls being a displaceable sidewall in a direction perpendicular to said longitudinal direction, so as to increase or diminish a cross-section of said enclosure, a plunger and a driving mechanism adapted to reciprocally move said plunger inside said enclosure, to thereby move crop material in said longitudinal direction, as to progressively form a rectangular bale in a bale forming process, one or more reinforcements arranged in connection with at least one of said sidewalls, said one or more reinforcements configured to neutralize or limit deformation of the at least one of said sidewalls by bulging with respect to an interior of the baling chamber, said deformation associated with said bale forming process, an actuator that exerts a pressure on said at least one displaceable sidewall, to thereby actuate displacement of said at least one displaceable sidewall;

at least one sensor mounted at a sensing location in an immediate vicinity of said one or more reinforcements and arranged to be in direct contact with the crop material in the baling chamber;

wherein said at least one sensor is a friction sensor, the friction sensor configured to measure directly a force from friction between crops moving forward in the baling chamber at the sensing location, or said at least one sensor is a moisture sensor, the moisture sensor configured to measure a moisture content of a advancing crop material, and wherein the sensor is mounted so as to overlap the reinforcement.

2. The baler of claim 1, wherein said one or more reinforcements comprise one or more reinforcement beams attached to one or more of said sidewalls, said reinforcement beams being arranged in the longitudinal direction of the baling chamber.

* * * * *